(12) United States Patent
Beyer et al.

(10) Patent No.: US 7,987,177 B2
(45) Date of Patent: Jul. 26, 2011

(54) METHOD FOR ESTIMATING THE NUMBER OF DISTINCT VALUES IN A PARTITIONED DATASET

(75) Inventors: Kevin Scott Beyer, San Jose, CA (US); Rainer Gemulla, Dresden (DE); Peter Jay Haas, San Jose, CA (US); Berthold Reinwald, San Jose, CA (US); John Sismanis, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 12/022,601

(22) Filed: Jan. 30, 2008

(65) Prior Publication Data

US 2009/0192980 A1 Jul. 30, 2009

(51) Int. Cl.
*G06F 17/00* (2006.01)
*G06F 17/30* (2006.01)

(52) U.S. Cl. ........ 707/713; 707/600; 707/698; 707/719; 707/747

(58) Field of Classification Search .................. 707/609, 707/687, 688, 697, 763, 776, 797–799, 803, 707/600, 698, 713, 718–719, 747; 706/45–50
See application file for complete search history.

(56) References Cited

U.S. PATENT DOCUMENTS

| 5,530,883 | A | * | 6/1996 | Baum et al. ............... 712/18 |
| 5,542,089 | A | | 7/1996 | Lindsay et al. |
| 5,727,197 | A | * | 3/1998 | Burgess et al. ............. 1/1 |
| 5,802,521 | A | * | 9/1998 | Ziauddin et al. ............ 1/1 |
| 5,832,475 | A | | 11/1998 | Agrawal et al. |
| 5,950,185 | A | | 9/1999 | Alon et al. |
| 5,999,928 | A | | 12/1999 | Yan |
| 6,061,676 | A | * | 5/2000 | Srivastava et al. ........... 1/1 |
| 6,226,629 | B1 | * | 5/2001 | Cossock ...................... 1/1 |
| 6,732,110 | B2 | * | 5/2004 | Rjaibi et al. ................. 1/1 |

(Continued)

FOREIGN PATENT DOCUMENTS

WO WO 2007/134407 * 11/2007

(Continued)

OTHER PUBLICATIONS

Phillip B. Gibbons, Distinct Sampling for highly-Accurate answers to Distinct values queries and event reports, proceedings of the 27th VLDB, 2001, 10 pages.*

(Continued)

*Primary Examiner* — Srirama Channavajjala
(74) *Attorney, Agent, or Firm* — IP Authority, LLC; Ramraj Soundararajan

(57) ABSTRACT

The task of estimating the number of distinct values (DVs) in a large dataset arises in a wide variety of settings in computer science and elsewhere. The present invention provides synopses for DV estimation in the setting of a partitioned dataset, as well as corresponding DV estimators that exploit these synopses. Whenever an output compound data partition is created via a multiset operation on a pair of (possibly compound) input partitions, the synopsis for the output partition can be obtained by combining the synopses of the input partitions. If the input partitions are compound partitions, it is not necessary to access the synopses for all the base partitions that were used to construct the input partitions. Superior (in certain cases near-optimal) accuracy in DV estimates is maintained, especially when the synopsis size is small. The synopses can be created in parallel, and can also handle deletions of individual partition elements.

14 Claims, 2 Drawing Sheets

U.S. PATENT DOCUMENTS

| | | | |
|---|---|---|---|
| 6,738,762 B1 * | 5/2004 | Chen et al. | 1/1 |
| 6,865,567 B1 * | 3/2005 | Oommen et al. | 1/1 |
| 7,047,230 B2 | 5/2006 | Gibbons | |
| 7,124,146 B2 | 10/2006 | Rjaibi et al. | |
| 2002/0083033 A1 * | 6/2002 | Abdo et al. | 707/1 |
| 2002/0198867 A1 * | 12/2002 | Lohman et al. | 707/3 |
| 2003/0208488 A1 | 11/2003 | Perrizo | |
| 2004/0049492 A1 * | 3/2004 | Gibbons | 707/2 |
| 2004/0059743 A1 * | 3/2004 | Burger | 707/101 |
| 2004/0133567 A1 * | 7/2004 | Witkowski et al. | 707/3 |
| 2005/0097072 A1 * | 5/2005 | Brown et al. | 707/1 |
| 2005/0147240 A1 | 7/2005 | Agrawal et al. | |
| 2005/0147246 A1 | 7/2005 | Agrawal et al. | |
| 2006/0047683 A1 * | 3/2006 | Lakshminarayan et al. | 707/102 |
| 2006/0218123 A1 * | 9/2006 | Chowdhuri et al. | 707/2 |
| 2008/0120274 A1 * | 5/2008 | Cruanes et al. | 707/2 |
| 2010/0010989 A1 * | 1/2010 | Li et al. | 707/5 |

FOREIGN PATENT DOCUMENTS

WO    WO 2010/104902   *  9/2010

OTHER PUBLICATIONS

Kevin Beyer1 et al. "On Synopses for DistinctValue Estimation Under Multiset Operations",SIGMOD'07, Jun. 12-14, 2007,, pp. 199-.*

Neoklis Polyzotis, "SelectivityBased Partitioning: A DivideandUnion Paradigm for Effective Query Optimization", CIKM'05, Oct. 31-Nov. 5, 2005.*

Abdelkader Hameurlain et al. "CPU and incremental memory allocation in dynamic parallelization of SQL queries",Parallel Computing 28 (2002) 525-556.*

Damianos Chatziantoniou et al. "Partitioned optimization of complex queries",Information Systems 32 (2007) 248-282.*

* cited by examiner

METHOD FOR ESTIMATING THE NUMBER OF DISTINCT VALUES IN A PARTITIONED DATASET

BACKGROUND OF THE INVENTION

1. Field of Invention

The present invention relates generally to the field of distinct-value estimation. More specifically, the present invention is related to a method for estimating the number of distinct values in a partitioned dataset.

2. Discussion of Related Art

The task of determining the number of distinct values (DVs) in a large dataset arises in a wide variety of settings in computer science, including data integration (for example, see papers to Brown et al. entitled, "Toward automated large-scale information integration and discovery," and Dasu et al. entitled, "Mining database structure; or, how to build a data quality browser,") query optimization (for example, see papers to Ioannidis et al, entitled, "The history of histograms," and the paper to Selinger et al. entitled, "Access path selection in a relational database management system,") network monitoring (for example, see paper to Estan et al. entitled, "Bitmap algorithms for counting active flows on high speed links,") and OLAP (for example, see papers to Padmanabhan et al. entitled, "Multi-dimensional clustering: a new data layout scheme in DB2," and the paper to Shukla et al. entitled, "Storage estimation for multidimensional aggregates in the presence of hierarchies"). The number of distinct values can be computed exactly by sorting the dataset and then executing a straightforward scan-and-count pass over the data; alternatively, a hash table can be constructed and used to compute the number of distinct values. Neither of these approaches scales to the massive datasets often encountered in practice, due to heavy time and memory requirements. A great deal of research over the past twenty five years has therefore focused on approximate methods that scale to very large datasets. These methods work either by drawing a random sample of the data items and using the observed frequencies of the values in the sample as a basis for estimation (see, for example, the paper to Charikar et al. entitled, "Towards estimation error guarantees for distinct values," the paper to Haas et al. entitled, "An estimator of the number of species from quadrat sampling," and the paper to Haas et al. entitled, "Estimating the number of classes in a finite population") or by taking a single pass through the data and using hashing techniques to compute an estimate using a bounded amount of memory (see, for example, the paper to Alon et al. entitled, "The space complexity of approximating the frequency moments," the paper to Astrahan et al. entitled, "Approximating the number of unique values of an attribute without sorting," the paper to Bar-Yossef et al. entitled, "Counting distinct elements in a data stream," the paper to Durand et al. entitled, "Loglog counting of large cardinalities," the paper to Estan et al. entitled, "Bitmap algorithms for counting active flows on high speed links," the paper to Flajolet et al. entitled, "Probabilistic counting algorithms for data base applications," the paper to Gibbons et al. entitled, "Distinct sampling for highly-accurate answers to distinct values queries and event reports," the paper to Giroire entitled, "Order statistics and estimating cardinalities of massive data sets," and the paper to Whang et al. entitled, "A linear-time probabilistic counting algorithm for database applications").

Almost all of this work has focused on producing a single synopsis of the entire dataset and then using the synopsis to obtain a DV estimate; methods for combining and exploiting synopses in the presence of set operations on partitioned datasets are virtually nonexistent. The present invention provides DV estimation methods in the context of a partitioned dataset, such as the "synopsis warehouse" environment described in the paper to Brown et al. entitled, "Techniques for warehousing of sample data." In a synopsis warehouse, incoming data is split into partitions, i.e., multisets of values, and a synopsis is created for each partition; the synopses are used to quickly estimate various partition properties. As partitions are rolled in and out of a full-scale warehouse, the corresponding synopses are rolled in and out of the synopsis warehouse. The architecture requires that synopses can be created in parallel, ensuring scalability, and that synopses can be combined to create a synopsis corresponding to the multiset union, intersection, or difference of the corresponding partitions, providing flexibility. The term "partition" is used here in a very general sense. Data may be partitioned—e.g., by time-stamp, by data value, and so forth—for purposes of parallel processing and dealing with fluctuating data-arrival rates. Data may also, however, be partitioned by its source—e.g., SAP customer addresses versus PeopleSoft customer addresses. In the latter scenario, comparison of data characteristics in different partitions may be of interest for purposes of metadata discovery and automated data integration (see, for example, the paper to Brown et al. entitled, "Toward automated large-scale information integration and discovery"). For example, DV estimates can be used to detect keys and duplicates in a partition, can help discover subset-inclusion and functional-dependency relationships, and can be used to approximate the Jaccard distance or other similarity metrics between the domains of two partitions (see, for example, the paper to Brown et al. entitled, "Toward automated large-scale information integration and discovery" and the paper to Dasu et al. entitled, "Mining database structure; or, how to build a data quality browser").

Now, previously-proposed synopses, DV estimators, and methods for handling compound partitions are discussed.

Synopses for Dv Estimation

In general, the literature on DV estimation does not discuss synopses explicitly, and hence does not discuss issues related to combining synopses in the presence of multiset operations on the corresponding partitions. One can, however, directly infer potential candidate synopses from the various algorithm descriptions.

Bit-Vector Synopses

The oldest class of synopses comprises various types of bit vectors. The "linear counting" technique (see, for example, the paper to Astrahan et al. entitled, "Approximating the number of unique values of an attribute without sorting," the paper to Estan et al. entitled, "Bitmap algorithms for counting active flows on high speed links," and the paper to Whang et al. entitled, "A linear-time probabilistic counting algorithm for database applications") uses a bit vector V of length M=O (D), together with a hash function h from $\mathcal{D}$ to $\{1, 2, \ldots, M\}$, where $\mathcal{D}$ denotes the domain of the dataset of interest and $D=|\mathcal{D}|$ is the number of distinct values in the dataset. The function h is applied to each element v in A, and the h(v)th bit of V is set to 1. After the dataset has been scanned, the estimate of D is the total number of 1-bits in V, multiplied by a correction factor. The correction factor compensates for undercounting due to "hash collisions" in which $h(v)=h(v')$ for $v \neq v'$; see, for example, the paper to Astrahan et al. entitled, "Approximating the number of unique values of an attribute without sorting." The O(D) storage requirement for linear counting is often prohibitive in applications where D can be very large, especially if multiple DV estimators must be maintained.

The "logarithmic counting" method of Astrahan et al. (in the paper entitled, "Approximating the number of unique values of an attribute without sorting") and Flajolet et al. (in the paper entitled, "Probabilistic counting algorithms for data base applications") uses a bit vector of length L=O(log D). The idea is to hash each of the distinct values in the dataset to the set $\{0,1\}^L$ of binary strings of length L, and keep track of r, the position (counting from the left, starting at 0) of the leftmost 0 bit over all of the hashed values. The estimate is roughly of the form $2^r$ (multiplied by a certain factor that corrects for "bias" and hash collisions). This tracking of r is achieved by taking each hashed value, transforming the value by zeroing out all but the leftmost 1, and computing the bitwise-OR of the transformed values. The value of r is then given by the leftmost 0 bit in the resulting bit vector. In the complete algorithm, several independent values of r are, in effect, averaged together (using a technique called "stochastic averaging") and then exponentiated. Alon et al. in the paper entitled, "The space complexity of approximating the frequency moments" analyze a variant of the logarithmic counting algorithm under an assumption of pairwise-independent hashing. Recent work by Durand and Flajolet in the paper entitled, "Loglog counting of large cardinalities" improves on the storage requirement of the logarithmic counting algorithm by tracking and maintaining r, the position of the leftmost 0, directly. The number of bits needed to encode r is O(log logD), and hence the technique is called LogLog counting.

The main drawback of the above bit-vector data structures, when used as synopses in the setting of a partitioned dataset, is that union is the only supported set operation. One must, e.g., resort to the inclusion/exclusion formula to handle intersections of partitions. As the number of set operations increases, this approach becomes extremely cumbersome, expensive, and inaccurate.

Several authors (for example, see the paper to Ganguly et al. entitled, "Tracking set-expression cardinalities over continuous update streams" and the paper to Shukla et al. entitled, "Storage estimation for multidimensional aggregates in the presence of hierarchies") have proposed replacing each bit in the logarithmic-counting bit vector by an exact or approximate counter, in order to permit DV estimation in the presence of both insertions and deletions to a dataset. This modification does not ameliorate the inclusion/exclusion problem, however.

Random Samples

Another synopsis possibility is to use a random sample of the data items in the partition (see, for example, the paper to Charikar et al. entitled, "Towards estimation error guarantees for distinct values," the paper to Haas et al. entitled, "An estimator of the number of species from quadrat sampling," and the paper to Haas et al. entitled, "Estimating the number of classes in a finite population"). The key drawback is that DV estimates computed from such a synopsis can be very inaccurate, especially when the data is skewed or when there are many distinct values, each having a low frequency (but not all unique); see the paper to Charikar et al. entitled, "Towards estimation error guarantees for distinct values" for a negative result on the performance of sample-based estimators. Moreover, combining synopses to handle unions of partitions can be expensive (see, for example, the paper to Brown et al. entitled, "Techniques for warehousing of sample data"), and it appears that the inclusion/exclusion formula is needed to handle intersections.

Sample-Counting Synopsis

Another type of synopsis arises from the "sample counting" DV-estimation method, also called "adaptive sampling," credited to Wegman (see the paper to Astrahan et al. entitled, "Approximating the number of unique values of an attribute without sorting" and the paper to Flajolet et al. entitled, "Adaptive sampling"). Here the synopsis for the dataset of interest comprises a subset of $\{h(v): v \in \mathcal{D}\}$, where h is a hash function as before. In more detail, the synopsis comprises a fixed-size buffer that holds binary strings of length L=log(M), together with a "reference" binary string s, also of length L. The idea is to hash the distinct values in the dataset, as in logarithmic counting, and insert the hashed values into a buffer that can hold up to k>0 hashed values; the buffer tracks only the distinct hash values inserted into it. When the buffer fills up, it is purged by removing all hashed values whose leftmost bit is not equal to the leftmost bit of s; this operation removes roughly half of the hashed values in the buffer. From this point on, a hashed value is inserted into the buffer if and only if the first bit matches the first bit of s. The next time the buffer fills up, a purge step (with subsequent filtering) is performed by requiring that the two leftmost bits of each hashed value in the buffer match the two leftmost bits of the reference string. This process continues until all the values in the dataset have been hashed. The final DV estimate is roughly equal to $K2^r$, where r is the total number of purges that have occurred and K is the final number of values in the buffer.

The algorithms in the paper to Bar-Yossef et al. entitled, "Counting distinct elements in a data stream," the paper to Gibbons et al. entitled, "Distinct sampling for highly-accurate answers to distinct values queries and event reports," and the paper to Gibbons et al. entitled, "Estimating simple functions on the union of data streams," embody the same idea, essentially with a "reference string" equal to 00 . . . 0. Indeed, the number of purges in the sample-counting algorithm corresponds to the "die level" used in the above-described paper to Gibbons et al. One difference in these algorithms is that the actual data values, and not the hashed values, are stored: the level at which a data value is stored encodes the number of leading 0's in its hashed representation. In the paper to Gibbons et al. entitled, "Distinct sampling for highly-accurate answers to distinct values queries and event reports," the stored values are augmented with additional information. Specifically, for each distinct value in the buffer, the algorithm maintains the number of instances of the value in the dataset (here a relational table) and also maintains a reservoir sample (see, for example, the paper to Vitter et al. entitled, "Random Sampling with a Reservoir") of the rows in the table that contain the value. This additional information can be exploited to obtain approximate answers, with probabilistic error guarantees, to a variety of SELECT DISTINCT queries over a partition. Such queries include, as a special case, the SELECT COUNT(DISTINCT) query that corresponds to the desired DV estimate. In the paper to Bar-Yossef et al. entitled, "Counting distinct elements in a data stream," the basic sample-counting algorithm is enhanced by compressing the stored values.

For sample-counting algorithms with reference string equal to 00 . . . 0, the synopsis holds the K smallest hashed values encountered, where K lies roughly between k/2 and k. The variability in K leads to inefficient storage and unstable DV estimates relative to the present invention.

The Bellman Synopsis

In the context of the Bellman system, the authors in the paper to Dasu et al. entitled, "Mining database structure; or, how to build a data quality browser" propose a synopsis related to DV estimation. This synopsis for a partition A comprises k entries and uses independent hash functions $h_1$, $h_2$, . . . , $h_k$; the ith synopsis entry is given by the ith minHash value $m_i = \min_{v \in \mathfrak{D}(A)} h_i(v)$, where $\mathfrak{D}(A)$ is the value domain of A. The synopsis for a partition is not actually used to directly compute the number of DVs in the partition, but rather to compute the Jaccard distance between partitions. When constructing the synopsis, each scanned data item in the partition incurs a cost of O(k), since the item must be hashed k times for comparison to the k current minHash values.

DV Estimators

Prior-art DV estimators have been provided in the context of a single (unpartitioned) dataset, so we discuss prior DV estimators in this setting. The present invention provides an estimator that is superior in this setting, and that also extends to the setting of set operations on multiple partitions.

The motivation behind virtually all DV estimators can be viewed as follows. If D points are placed randomly and uniformly on the unit interval (where D is assumed to be large), then, by symmetry, the expected distance between any two neighboring points is $1/(D+1) \approx 1/D$, so that the expected value of $U_{(k)}$, the kth smallest point, is $E[U_{(k)}] \approx k/D$. Thus $D \approx k/E[U_{(k)}]$. The simplest estimator of $E[U_{(k)}]$ is simply $U_{(k)}$ itself, and yields the basic estimator:

$$\hat{D}_k^{BE} = k/U_{(k)}$$

The simplest connection between the above idea and the DV estimation problem rests on the observation that a hash function often "looks like" a uniform random number generator. In particular, let $v_1, v_2, \ldots, v_D$ be an enumeration of the distinct values in the dataset and let h be a hash function as before. For many hash functions, the sequence $h(v_1), h(v_2), \ldots, h(v_D)$ will look like the realization of a sequence of independent and identically distributed (i.i.d.) samples from the discrete uniform distribution on $\{0, 1, \ldots, M\}$. Provided that M is sufficiently greater than D, the sequence $U_1 = h(v_1)/M$, $U_2 = h(v_2)/M$, ..., $U_D = h(v_D)/M$ will approximate the realization of a sequence of i.i.d. samples from the continuous uniform distribution on [0,1]. This assertion requires that M be much larger than D to avoid collisions, i.e., to ensure that, with high probability, $h(v_i) \neq h(v_j)$ for all $i \neq j$. A "birthday problem" argument shows that collisions will be avoided when $M = O(D^2)$. It is assumed henceforth that, for all practical purposes, any hash function that is discussed avoids collisions. The term "looks like" is used in an empirical sense, which suffices for applications. Thus, in practice, the estimator $\hat{D}_k^{BE}$ can be applied with $U_{(k)}$ taken as the kth smallest hash value, multiplied by a normalizing factor of 1/M. The estimator $\hat{D}_k^{BE}$ is biased upwards for each possible value of D. The present invention provides an unbiased estimator that also has a lower mean-squared error (MSE) than $\hat{D}_k^{BE}$ in the setting of a single dataset.

The estimator $\hat{D}_k^{BE}$ was proposed in the paper to Bar-Yossef et al. entitled, "Counting distinct elements in a data stream," along with conservative error bounds based on Chebyshev's inequality. Both the logarithmic and sample-counting estimators can be viewed as approximations to the basic estimator. For logarithmic counting, specifically the Flajolet-Martin algorithm, consider the binary decimal representation of the normalized hash values $h(v)/M$, where $M=2^L$. For example, a hash value $h(v)=00100110$, after normalization, will have the binary decimal representation 0.00100110. It can be seen that the smallest normalized hash value is approximately equal to $2^{-r}$, so that, modulo the correction factor, the Flajolet-Martin estimator (without stochastic averaging) is $\frac{1}{2}^{-r}$, which roughly corresponds to $\hat{D}_1^{BE}$. Because this latter estimate is unstable, in that $E[\hat{D}_1^{BE}] = \infty$, the final Flajolet-Martin estimator uses stochastic averaging to average independent values of r and hence compute an estimator $\hat{E}$ of $E[\log_2 \hat{D}_1^{BE}]$, leading to a final estimate of $\hat{D} = C_2^{\hat{E}}$, where the constant c approximately unbiases the estimator. (the new estimators are exactly unbiased.) For sample counting, suppose, without loss of generality, that the reference string is 00...0 and, as before, consider the normalized binary decimal representation of the hashed values. Thus the first purge leaves behind normalized values of the form 0.0..., the second purge leaves behind values of the form 0.00..., and so forth, the last (rth) purge leaving behind only normalized hashed values with r leading 0's. Thus the number $2^{-r}$ (which has r-1 leading 0's) is roughly equal to the largest of the K normalized hashed values in the size-k buffer, so that the estimate $K/2^{-r}$ is roughly equal to $\hat{D}_k^{BE}$.

The paper to Giroire et al. entitled, "Order statistics and estimating cardinalities of massive data sets" studies a variant of $\hat{D}_k^{BE}$ in which the hashed values are divided into m>1 subsets, leading to m i.i.d. copies of the basic estimator. These copies are obtained by dividing the unit interval into m equal segments; the jth copy of the basic estimator is based on all of the hashed values that lie in the jth segment, after shifting and scaling the segment (and the points therein) into a copy of the unit interval. (Note that for a fixed synopsis size k, each copy of the basic estimator is based on approximately k/m observations.) Each copy of the basic estimator is then subjected to a nonlinear transformation g, and multiplied by a correction factor c. The function g is chosen to "stabilize" the estimator, and the constant c is chosen to ensure that the estimator is asymptotically unbiased as k becomes large. Finally, the i.i.d. copies of the transformed estimators are averaged together. The motivation behind the transformation g is to avoid the instability problem, discussed previously, that arises when k=1. Later, the present invention's proposed estimator is shown to be unbiased for any values of D and k>1, while being less cumbersome to compute. Moreover, when D>>k>>0, the estimator provided by the current invention has approximately the minimum possible MSE, and hence is at least as statistically efficient as any estimator in the paper to Giroire et al. entitled, "Order statistics and estimating cardinalities of massive data sets."

DV Estimators for Compound Partitions

As mentioned above, previous work has mostly focused on DV estimation for a single dataset. To allow for more scalable and flexible data processing, it is convenient to decompose a dataset into a collection of disjoint "base" partitions. A compound partition in a partitioned dataset is formed from two or more of the base partitions via one or more multiset union, multiset intersection, and multiset difference operations. To our knowledge, the only prior discussion of how to construct DV-related estimates for compound partitions is found in the paper to Dasu et al. entitled, "Mining database structure; or, how to build a data quality browser." DV estimation for the intersection of partitions A and B is not computed directly. Instead, the Jaccard distance $\rho = D_{A \cap B}/D_{A \cup B}$ (called the "resemblance" in the paper to Dasu et al. entitled, "Mining database structure; or, how to build a data quality browser") is estimated first and then, using the estimator $\hat{\rho}$, the number of values in the intersection is estimated as $$\hat{D}_{A \cap B} = \frac{\hat{\rho}}{\hat{\rho} + 1}(D_A + D_B).$$

Here and elsewhere, $D_X$ denotes the number of distinct values in partition X.

The quantities $D_A$ and $D_B$ are computed exactly, by means of GROUP BY queries; the present invention provides estimators that avoid the need to compute or estimate these quantities. There is no discussion in the paper to Dasu et al. entitled, "Mining database structure; or, how to build a data quality browser" of how to handle any set operations other than the intersection of two partitions. If one uses the principle of inclusion/exclusion to handle other set operations, the resulting estimation procedure will not scale well as the number of operations increases. The present invention's methods handle arbitrarily complex combinations of operations on partitions (multiset unions, intersections, and differences) in an efficient manner.

Whatever the precise merits, features, and advantages of the prior art, none of them achieves or fulfills the purposes of the present invention.

SUMMARY OF THE INVENTION

The present invention provides synopses for DV estimation in the setting of a partitioned dataset, as well as corresponding DV estimators that exploit these synopses. Whenever an output compound data partition is created via a multiset operation on a pair of (possibly compound) input partitions, the synopsis for the output partition can be obtained by combining the synopses of the input partitions. If the input partitions are compound partitions, it is not necessary to access the synopses for all of the base partitions that were used to construct the input partitions. Superior (in certain cases near-optimal) accuracy in the DV estimates is maintained, especially when the size of the synopsis is small.

Specifically, the present invention teaches the use of an "AKMV synopsis," extending an idea in the paper to Bar-Yossef et al. entitled, "Counting distinct elements in a data stream" in order to handle multiset operations gracefully. The present invention's extensions involve adding counters to the basic synopsis (see for example, the paper to Ganguly et al. entitled, "Tracking set-expression cardinalities over continuous update streams," the paper to Gibbons et al. entitled, "Distinct sampling for highly-accurate answers to distinct values queries and event reports," and the paper to Shukla et al. entitled, "Storage estimation for multidimensional aggregates in the presence of hierarchies"). The present invention also teaches methods for combining AKMV synopses, such that the collection of these synopses is "closed" under multiset operations on the parent partitions. The AKMV synopsis can also handle deletions of individual elements from the dataset.

The present invention's new DV estimators generalize and improve the basic DV estimator proposed in the paper to Bar-Yossef et al. entitled, "Counting distinct elements in a data stream." Specifically, the new DV estimator is unbiased and can be used with both base and compound partitions. When applied to a base partition, the new estimator has lower MSE than the basic DV estimator and, if the number of DVs is large, has essentially the minimum possible MSE of any DV estimator. The invention provides measures of estimation error to accompany the provided DV estimates, as well as a method to determine an appropriate size for the AKMV synopses prior to seeing the dataset. In an alternative embodiment, the current invention provides a maximum-likelihood DV estimator.

The present invention, in one embodiment, teaches a computer-based method to estimate distinct values in a partitioned dataset, wherein the computer-based method comprises the steps of: (a) creating a synopsis of each partition in a partitioned dataset; (b) combining created synopsis to construct distinct value (DV) estimations of a base partition or of a compound partition that is based on at least one of the following multiset operations: multiset-union, multiset-intersection, and multiset-difference; and (c) outputting said constructed DV estimations in (b).

The present invention, in one embodiment, teaches a computer-based method to estimate distinct values in a partitioned dataset, wherein the computer-based method comprises the steps of: (a) selecting a hash function h with domain $\mathcal{D}$, which is a value domain of the partitioned dataset, and range $\{0, 1, \ldots, M\}$, wherein $M = O(|\mathcal{D}|^2)$ and $|\mathcal{D}|$ is the number of distinct values in $\mathcal{D}$, said hash function h to be used for all synopses in said partitioned dataset; (b) in case of a partition being a base partition A with domain $\mathcal{D}(A)$: (i) hashing each value in $\mathcal{D}(A)$ using hash function h; (ii) recording k smallest values $h(v_1), h(v_2), \ldots, h(v_k)$ among said hashed values, as well as recording the multiplicity of each of the values $v_1, v_2, \ldots, v_k$ in A, and (iii) creating the synopsis as an AKMV synopsis $L_A^+ = (L_A, c_A)$ based on said recorded k smallest values and said recorded multiplicities; or in case of a partition being a compound partition G=E op F, where op is one of $\cap_m$, $\cup_m$, and $\setminus_m$, and E and F have respective AKMV synopses $L_E^+ = (L_E, c_E)$ and $L_F^+ = (L_F, c_F)$ of sizes $k_E$ and $k_F$, creating the synopsis as an AKMV synopsis $L_G^+ = (L_E \oplus L_F, c_G)$, where, for each $w \in L_E \oplus L_F$, $$c_G(w) = \begin{cases} c_E(w) + c_F(w) & \text{if } op = \cup_m \\ \min(c_E(w), c_F(w)) & \text{if } op = \cap_m \\ \max(c_E(w) - c_F(w), 0) & \text{if } op = \setminus_m. \end{cases}$$

(c) combining synopsis created in (b) to construct distinct value (DV) estimations of a base partition or of a compound partition that is based on at least one of the following multiset operations: multiset-union, multiset-intersection, and multiset-difference; and (d) outputting said constructed DV estimations in (b).

In one embodiment, the following unbiased estimator is used to construct the DV estimations for a partition E having an AKMV synopsis $L_E^+ = (L_E, c_E)$ of size k:

$$\hat{D}_E = \frac{K_E}{k}\left(\frac{k-1}{U_{(k)}}\right)$$

wherein $K_E$ is the number of non-zero elements in $c_E$ and $U_{(k)}$ is the largest value in $L_E$, multiplied by a factor of $1/M$.

In one embodiment, the estimator error of the DV estimator $\hat{D}_E$ is assessed as any of, or a combination of, the following: a number $\epsilon_p$ that bounds the expected absolute ratio error (ARE) from above with probability approximately 100 p %, wherein said number $\epsilon_p$ is computed as the solution to the equation $p = \Delta(k\hat{D}_E/j, k, \epsilon_p)$, with k the size of the AKMV synopsis $L_E^+ = (L_E, c_E)$ for E and j the observed number of nonzero elements in $c_E$, or an approximate variance of estimator $\hat{D}_E$, computed as $$Var[\hat{D}_E] \approx \frac{\hat{D}_E\left(\frac{(k-1)^2}{U_{(k)}} - k^2 + k + \hat{D}_E\right)}{k(k-2)}.$$

In one embodiment, AKMV synopses are maintained in the presence of deletions by: updating the synopsis (L, c) of a partition after deletion of a value v from the partition, wherein h(v)=w, by updating counter c(w) according to c(w)=max(c (w)−1, 0), if w is present in L, and by periodically recomputing the synopsis from scratch when estimation errors become unacceptable.

In one embodiment, the size k of each of the synopses for the base partitions is chosen a priori by setting $k = \lceil 2 + 2/(\pi \epsilon^2) \rceil$, where $\epsilon$ is a desired upper bound on the expected ARE of a base-partition DV estimate.

The present invention also teaches an article of manufacture having computer readable program code implementing the steps of each of the computer-based methods described above to estimate distinct values in a partitioned dataset.

DESCRIPTION OF THE PREFERRED EMBODIMENTS

Figure 1:
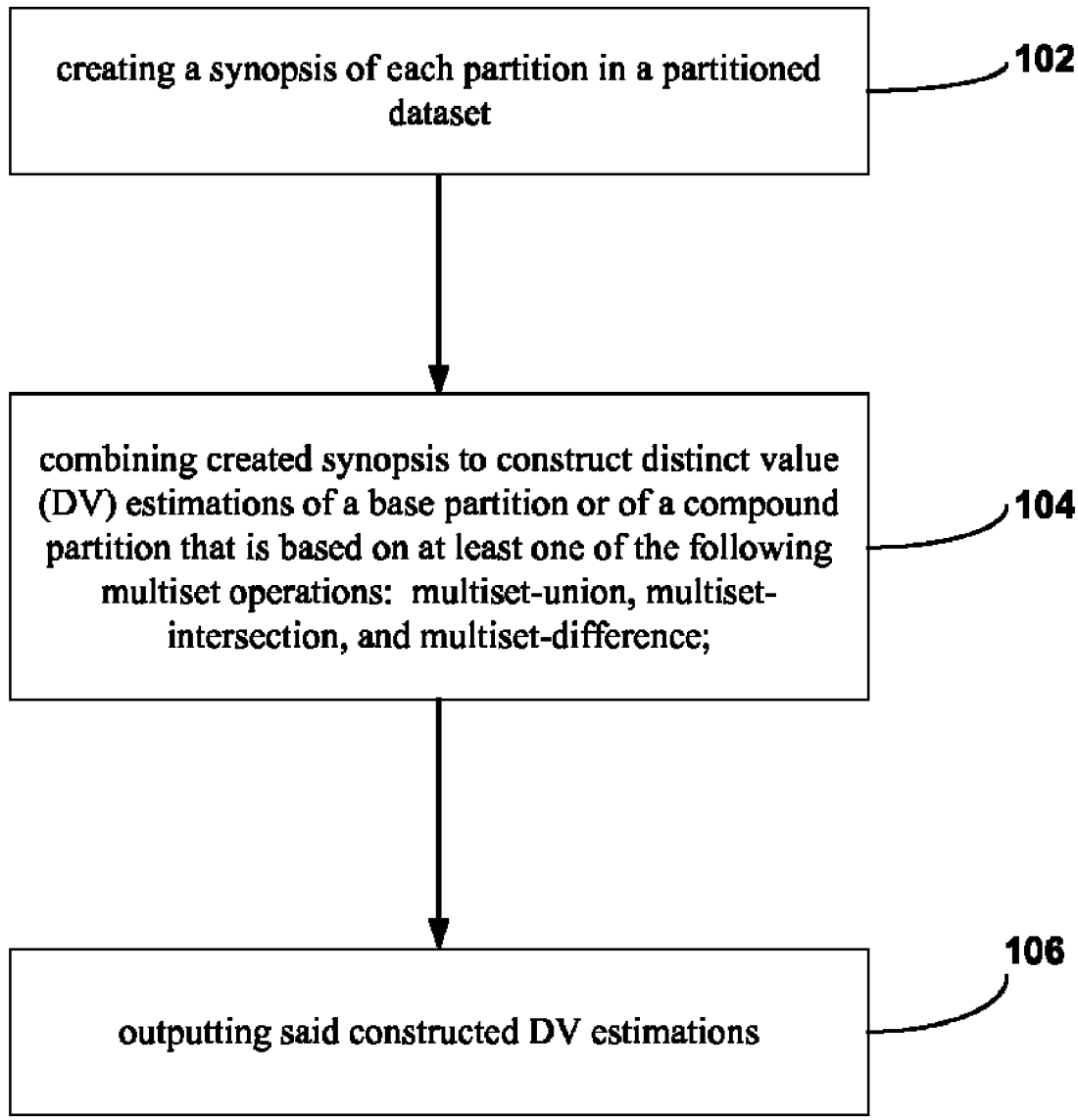
FIG. 1 illustrates one embodiment of the present invention's computer-based method to estimate distinct values in a partitioned dataset.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The AKMV Synopsis for Base Partitions

The AKMV synopsis for a base partition A is constructed as follows. First, each value in the domain $\mathcal{D}(A)$ is hashed using a hash function h with range $\{0, 1, \ldots, M\}$, and then the k smallest of the hashed values are recorded in a data structure $L_A$. Those skilled in the art can envision appropriate data structures for this purpose; in the current description, $L_A$ is referred to as a "set." This set is sometimes called a KMV synopsis (of size k). The AKMV synopsis $L_A^+ = (L_A, c_A)$ is obtained by augmenting $L_A$ with a counter vector $c_A$, with one entry for each element $w \in L_A$. Specifically, if w is an element of $L_A$ with $w = h(v)$, then $c_A(w)$ equals the number of times the value v appears in the multiset A, i.e., the multiplicity of v in A. An AKMV synopsis is said to be of size k if its constituent KMV synopsis is of size k. An AKMV vector requires $O(k \log D_A + k \log Q_A)$ bits of storage, where $D_A$ is the number of distinct values in A and $Q_A$ is the maximum multiplicity of a value in A. Note that, if A is a set, rather than a multiset, then it suffices to maintain a bit vector rather than a vector of counts, so that the size of the synopsis is $O(k \log D_A)$.

An AKMV synopsis of size k can be computed from a single scan of the data partition, using Algorithm 1, shown below.

---
Algorithm 1 - (AKMV Computation for a Base Partition)
---
1: h: hash function from domain of dataset to $\{0, 1, \ldots, M\}$
2: L: list of k smallest hashed partition values seen so far
3: maxVal(L): returns the largest value in L
4: c: list of counters corresponding to the values in L ---
Algorithm 1 - (AKMV Computation for a Base Partition)
---
5:
6:  for each item v in the partition do
7:    w = h(v)
8:    if w ∉ L then
9:      if |L| < k then
10:       insert w into L and set new counter c(w) = 1
11:     else if w < maxVal(L) then
12:       insert w into L and set new counter c(w) = 1
13:       remove largest element w' of L
14:       remove counter c(w')
15:     end if
16:   else set c(w) = c(w) + 1
17:   end if
18: end for One skilled in the art will envision appropriate data structures for implementing this algorithm, for example, a priority queue to facilitate identification of the largest element of L in lines 11 and 13, and a temporary hash table to facilitate the membership check in line 8 and the counter updates in lines 14 and 16. Assuming that the scan order of the items in a partition is independent of the hashed item values, as is virtually always the case, it can be shown that the expected cost to construct an AKMV synopsis of size k from a base partition A comprising $N_A$ data items having $D_A$ distinct values is $O(N_A + k (\log k)(\log D_A))$. This construction cost compares favorably to the $O(k N_A)$ cost for the Bellman synopsis. Moreover, when $D_A$ is small, the AKMV synopsis contains more information in a statistical sense than the Bellman synopsis, since the former synopsis essentially samples distinct values without replacement, whereas the latter synopsis samples distinct values with replacement. The cost for the AKMV synopsis is comparable to that of the sample-counting synopsis in the paper to Gibbons et al. entitled, "Estimating simple functions on the union of data streams." Indeed, the sample-counting synopsis is very similar to KMV, except that the size is a random variable K whose value ranges between roughly k/2 and k. Thus the AKMV synopsis contains more statistical information for a given space allocation, and yields DV estimators that are statistically more stable.

Combining AKMV Synopses

A method for combining AKMV synopses is now described. Suppose partitions E and F—having respective AKMV synopses $L_E^+ = (L_E, c_E)$ and $L_F^+ = (L_F, c_F)$ of sizes $k_E$ and $k_F$—are combined to create a compound partition G = E op F, where op is one of multiset-union, multiset-intersection, or multiset-difference, denoted by $\cap_m$, $\cup_m$, and $\setminus_m$, respectively. It is assumed throughout that all synopses are created using the same hash function h from $\mathcal{D}$ to $\{1, 2, \ldots, M\}$, where $\mathcal{D}$ denotes the domain of the values in the dataset and $M = O(|\mathcal{D}|^2)$ as discussed previously. The AKMV synopsis for G is defined as $L_G^+ = (L_E \oplus L_F, c_G)$. Here, $L_E \oplus L_F$ is defined to be the set comprising the k smallest values in $L_E \cap L_F$, where $k = \min(k_E, k_F)$. (Observe that the $\oplus$ operator is symmetric and associative.) Moreover, $c_G$ is defined by setting $$c_G(w) = \begin{cases} c_E(w) + c_F(w) & \text{if } op = \cup_m \\ \min(c_E(w), c_F(w)) & \text{if } op = \cap_m \\ \max(c_E(w) - c_F(w), 0) & \text{if } op = \setminus_m \end{cases}$$

for each $w \in L_E \oplus L_F$. In these definitions, take $c_X(w) = 0$ if $w \notin L_X$.

In the above method, E and F may themselves be compound partitions. It follows that, in general, if G is a compound partition created by applying the operations $\cap m$, $\cup m$, and $\setminus m$ to $n \geq 2$ base partitions $A_1, A_2, \ldots, A_n$, the AKMV synopsis $L_G^+ = (L_G, c_G)$ satisfies $L_G = L_{A_1} \oplus L_{A_2 \oplus \ldots \oplus L_{A_n}}$ and, moreover, if $w \in L_G$ with $w = h(v)$, then $c_E(w)$ is precisely the multiplicity of $v$ in E. Importantly, when combining E and F to create G, the AKMV synopsis $L_G^+$ can be created directly from $L_E^+$ and $L_F^+$; there is no need to access the "base" synopses $L_{A_1}^+, L_{A_2}^+, \ldots, L_{A_n}^+$.

In summary, the collection of AKMV synopses over compound partitions is closed under multiset operations. Therefore, synopses for base partitions can be computed using Algorithm 1 and, as compound partitions are built up from base partitions, the synopses for these compound partitions can be built up concomitantly.

One skilled in the art will perceive that, if the only multiset operations of interest are multiset-union and multiset-intersection, then it suffices to maintain KMV synopses, rather than AKMV synopses.

Handling Deletions

It is now shown how AKMV synopses can easily support deletions of individual items. Consider a partition A that receives a stream of transactions of the form +v or −v, corresponding to the insertion or deletion, respectively, of value v.

The invention maintains two AKMV synopses: a synopsis $L_i^+$ for the multiset $A_i$ of inserted items and a synopsis $L_d^+$ for the multiset $A_d$ of deleted items. Computing the AKMV synopsis of the multiset difference $A_i \setminus^m A_d$ yields the AKMV synopsis $L_A^+$ of the true multiset A. Because $A_i$ and $A_d$ are always growing with time, they can become significantly larger than the actual partition A, so that DV estimates will be of low quality. Therefore, whenever the number of deletions causes the error bounds to become unacceptable, a fresh scan of the data can be used to produce a new pair of synopses $L_i^+$ and $L_d^+$ corresponding to $A_i = A$ and $A_d = \emptyset$.

This method does not actually require two synopses. The counters in a single AKMV synopsis L are maintained by incrementing the counter at each insertion and decrementing at each deletion, while ensuring that each counter is nonnegative. If synopsis entries are retained having counter values equal to 0, the synopsis L described above is produced.

New DV Estimator

Given a compound partition E and a corresponding AKMV synopsis $L_E^+ = (L_E, c_E)$ of size k, the preferred embodiment estimates the number of DVs in E as:

$$\hat{D}_E = \frac{K_E}{k}\left(\frac{k-1}{U_{(k)}}\right)$$

where $K_E$ is the number of non-zero elements in $c_E$ and $U_{(k)}$ is the largest value in $L_E$, multiplied by a normalizing factor of $1/M$. This estimator is unbiased for $D_E$, the true number of distinct values in E.

In the special case where E=A for a base partition A, it is seen that $K_A = k$, and so the general estimator reduces to the simpler expression $$\hat{D}_A = \frac{k-1}{U_{(k)}}$$

where $U_{(k)}$ is the largest value in $L_A$, multiplied by $1/M$. When the number of distinct values in A is large, $\hat{D}_A$ has approximately the minimum possible MSE of any estimator of $D_A$, and has smaller MSE than the basic estimator $\hat{D}_k^{BE}$ for any number of distinct values.

Assessing Estimation Error

The error associated with $\hat{D}_E$ may be assessed, as follows. For $n \geq k \geq 1$, set $\Delta(n, k, \varepsilon) = I_{u(n,k,\varepsilon)}(k, n-k+1) - I_{l(n,k,\varepsilon)}(k, n-k+1)$ where $I_x(a,b)$ is the regularized incomplete beta function defined by $$I_x(a, b) = \frac{\int_0^x t^{a-1}(1-t)^{b-1} dt}{\int_0^1 t^{a-1}(1-t)^{b-1} dt},$$

and where $$u(D, k, \varepsilon) = \frac{k-1}{(1-\varepsilon)D} \text{ and } l(D, k, \varepsilon) = \frac{k-1}{(1+\varepsilon)D}.$$

Take $\Delta(\infty, k, \varepsilon) = 0$. Then, given an estimate $\hat{D}_E$ computed as above using an AKMV synopsis $L_E^+$ of size k, together with an observed value $K_E = j$ and a specified value $0 < p < 1$, use standard numerical root-finding algorithms to compute the value $\varepsilon_p$ that solves the equation $p = \Delta(k\hat{D}_E/j, k, \varepsilon_p).$ Then the absolute ratio error (ARE) of the estimator, defined as $$ARE[\hat{D}_E] = \frac{|\hat{D}_E - D_E|}{D_E},$$

is less than or equal to $\varepsilon_p$ with probability approximately 100 p %.

In an alternative embodiment, the variance of the estimator may be computed approximately as $$\text{Var}[\hat{D}_E] \approx \frac{\hat{D}_E\left(\frac{(k-1)^2}{U_{(k)}} - k^2 + k + \hat{D}_E\right)}{k(k-2)},$$

where $U_{(k)}$ is the largest value in $L_E$, multiplied by $1/M$.

Those skilled in the art can see how to modify the forgoing methods (both for computing and combining AKMV synopses and for estimating the number of DVs in a partition) to handle degenerate cases in which the size of a synopsis of a partition coincides with the number of DVs in the partition, so that the synopsis contains complete information about the number of DVs in the partition.

Alternative DV Estimators

The preferred embodiment $\hat{D}_E$ of the DV estimator for a compound partition E, based on an AKMV synopsis of size k, can be written as $\hat{D}_E = \hat{D}_E^{(1)} \hat{D}_E^{(2)}$, where $\hat{D}_E^{(1)} = K_E/k$ and $\hat{D}_E^{(2)} = (k-1)/U_{(k)}$. Denoting by $A_1, A_2, \ldots, A_n$, the base partitions used to construct E and by V the union of sets $A_1, A_2, \ldots, A_n$, it can be seen that the first term $\hat{D}_E^{(1)}$ is an unbiased estimator of the ratio $D_E/D_V$, and the second term $\hat{D}_E^{(2)}$ is an unbiased estimator of $D_V$, and these two terms are statistically independent. In particular, if $E = A_1 \cup A_2$, then $\hat{D}_E^{(1)}$ is an unbiased estimator of the Jaccard distance between $A_1$ and $A_2$.

In alternative embodiments, the term $\hat{D}_E^{(2)}$ may be replaced by the basic estimator $\hat{D}_k^{BE}$ for $D_V$, or by the maximum likelihood estimator for $D_V$. The latter estimator is computed as the solution D to the equation $\ln(1-U_{(k)})-\Psi(D-k+1)+\Psi(D+1)=0$, where $U_{(k)}$ is the largest value in the KMV synopsis for E, multiplied by 1/M, and $\Psi$ is the digamma function. This equation can be solved numerically using standard root-finding algorithms. When the number of distinct values is large, the values of $\hat{D}_E^{(2)}$, the basic estimator, and the maximum-likelihood estimator are almost identical.

Pre-Selecting a Synopsis Size

An appropriate value of k may be selected in advance of observing the dataset. Suppose that it is desired to limit the expected ARE of the DV estimate for each partition to a maximum value of $\epsilon$. This goal can be achieved by choosing $k=\lceil 2+2/(\pi\epsilon^2)\rceil$, where $\lceil x\rceil$ denotes the smallest integer greater than or equal to x.

FIG. 1 illustrates one embodiment of the present invention's computer-based method to estimate distinct values in a partitioned dataset, wherein the computer-based method comprises the steps of: (a) creating a synopsis of each partition in a partitioned dataset 102; (b) combining created synopsis to construct distinct value (DV) estimations of a base partition or of a compound partition that is based on at least one of the following multiset operations: multiset-union, multiset-intersection, and multiset-difference 104; and (c) outputting said constructed DV estimations in (b) 106.

When the partition is a base partition A with domain $\mathcal{D}(A)$, the method creates a synopsis of a partition as per the following steps: selecting a hash function h with domain $\mathcal{D}$, which is a value domain of the partitioned dataset, and range $\{0, 1, \ldots, M\}$, wherein $M=O(|\mathcal{D}|^2)$ and $|\mathcal{D}|$ is the number of distinct values in $\mathcal{D}$, said hash function h to be used for all synopses in said partitioned dataset; hashing each value in $\mathcal{D}(A)$ using hash function h; recording k smallest values $h(v_1), h(v_2), \ldots, h(v_k)$ among said hashed values, as well as recording the multiplicity of each of the values $v_1, v_2, \ldots, v_k$ in A, and creating said synopsis as an AKMV synopsis $L_A^+=(L_A, c_A)$ based on said recorded k smallest values and said recorded multiplicities.

When a partition is a compound partition G=E op F (where op is one of $\cup m$, $\cap m$, and $\backslash m$, and E and F have respective AKMV synopses $L_E^+=(L_E, c_E)$ and $L_F^+=(L_F, c_F)$ of sizes $k_E$ and $k_F$), the method creates a synopses of a partition as per the following steps: selecting a hash function h with domain $\mathcal{D}$, which is a value domain of the partitioned dataset, and range $\{0, 1, \ldots, M\}$, wherein $M=O(|\mathcal{D}|)$ and $|\mathcal{D}|$ is the number of distinct values in $\mathcal{D}$, said hash function h to be used for all synopses in said partitioned dataset; and creating said synopsis as an AKMV synopsis $L_G^+=(L_E\oplus L_F, c_G)$, where, for each $w\in$ $$L_E \oplus L_F, \ c_G(w) = \begin{cases} c_E(w)+c_F(w) & \text{if } op = \bigcup_m \\ \min(c_E(w), c_F(w)) & \text{if } op = \bigcap_m \\ \max(c_E(w)-c_F(w), 0) & \text{if } op = \backslash_m. \end{cases}$$

Figure 2:
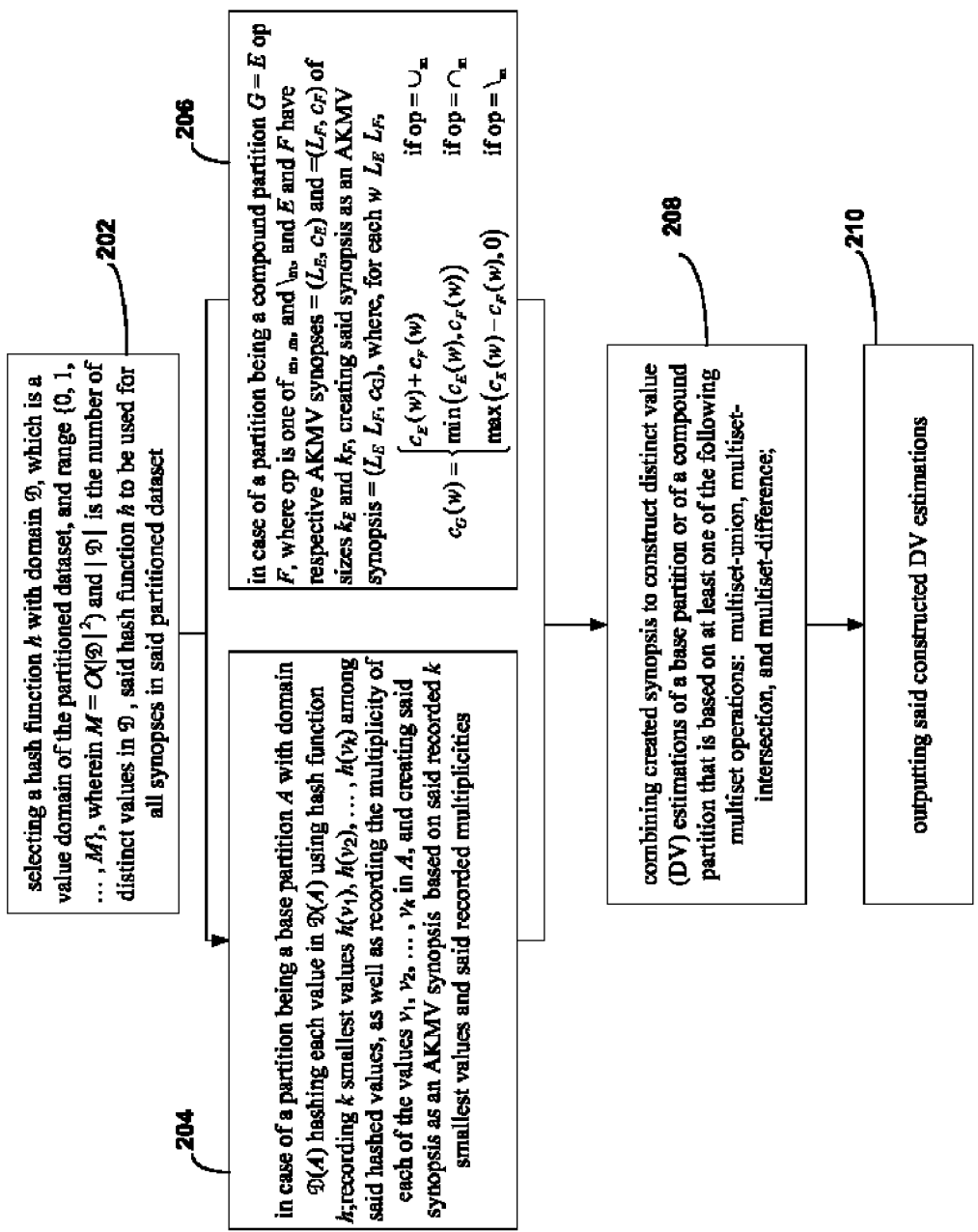
FIG. 2 another embodiment of the present invention's computer-based method to estimate distinct values in a partitioned dataset.

FIG. 2 illustrates another embodiment of the present invention's computer-based method to estimate distinct values in a partitioned dataset, wherein the computer-based method comprises the steps of: (a) selecting a hash function h with domain $\mathcal{D}$, which is a value domain of the partitioned dataset, and range $\{0, 1, \ldots, M\}$, wherein $M=O(|\mathcal{D}|)$ and $|\mathcal{D}|$ is the number of distinct values in $\mathcal{D}$, said hash function h to be used for all synopses in said partitioned dataset 202; (b) in case of a partition being a base partition A with domain $\mathcal{D}(A)$ 204: (i) hashing each value in $\mathcal{D}(A)$ using hash function h; (ii) recording k smallest values $h(v_1), h(v_2), \ldots, h(v_k)$ among said hashed values, as well as recording the multiplicity of each of the values $v_1, v_2, \ldots, v_k$ in A, and (iii) creating the synopsis as an AKMV synopsis $L_A^+=(L_A, c_A)$ based on said recorded k smallest values and said recorded multiplicities; or in case of a partition being a compound partition G=E op F 206, where op is one of $\cup m$, $\cap m$, and $\backslash m$, and E and F have respective AKMV synopses $L_E^+=(L_E, c_E)$ and $L_F^+=(L_F, c_F)$ of sizes $k_E$ and $k_F$, creating the synopsis as an AKMV synopsis $L_G^+=(L_E\oplus L_F, c_G)$, where, for each $w\in L_E\oplus L_F$, $$c_G(w) = \begin{cases} c_E(w)+c_F(w) & \text{if } op = \bigcup_m \\ \min(c_E(w), c_F(w)) & \text{if } op = \bigcap_m \\ \max(c_E(w)-c_F(w), 0) & \text{if } op = \backslash_m. \end{cases}$$

(c) combining synopsis created in (b) to construct distinct value (DV) estimations of a base partition or of a compound partition that is based on at least one of the following multiset operations: multiset-union, multiset-intersection, and multiset-difference 208; and (d) outputting said constructed DV estimations in (b) 210.

In one embodiment, the following unbiased estimator is used to construct the DV estimations for a partition E having an AKMV synopsis $L_E^+=(L_E, c_E)$ of size k:

$$\hat{D}_E = \frac{K_E}{k}\left(\frac{k-1}{U_{(k)}}\right)$$

wherein $K_E$ is the number of non-zero elements in $c_E$ and $U_{(k)}$ is the largest value in $L_E$, multiplied by a factor of 1/M.

In one embodiment, the estimator error of the DV estimator $\hat{D}_E$ is assessed as any of, or a combination of, the following: a number $\epsilon_p$ that bounds the expected absolute ratio error (ARE) from above with probability approximately 100 p %, wherein said number $\epsilon_p$ is computed as the solution to the equation $p=\Delta(k\hat{D}_E/j, k, \epsilon_p)$, with k the size of the AKMV synopsis $L_E^+=(L_E, c_E)$ for E and j the observed number of nonzero elements in $c_E$, or an approximate variance of estimator $\hat{D}_E$, computed as $$\text{Var}[\hat{D}_E] \approx \frac{\hat{D}_E\left(\frac{(k-1)^2}{U_{(k)}}-k^2+k+\hat{D}_E\right)}{k(k-2)}.$$

In one embodiment, AKMV synopses are maintained in the presence of deletions by: updating the synopsis (L, c) of a partition after deletion of a value v from the partition, wherein h(v)=w, by updating counter c(w) according to c(w)=max(c(w)−1, 0), if w is present in L, and by periodically recomputing the synopsis from scratch when estimation errors become unacceptable.

In one embodiment, the size k of each of the synopses for the base partitions is chosen a priori by setting $k=\lceil 2+2/(\pi\epsilon^2)\rceil$, where $\epsilon$ is a desired upper bound on the expected ARE of a base-partition DV estimate.

Additionally, the present invention provides for an article of manufacture comprising computer readable program code contained within implementing one or more modules to implement a method for estimating the number of distinct values in a collection of data partitions. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) creating a synopsis of each partition in a partitioned dataset; (b) combining created synopsis to construct distinct value (DV) estimations of a base partition or of a compound partition that is based on at least one of the following multiset operations: multiset-union, multiset-intersection, and multiset-difference; and (c) outputting said constructed DV estimations in (b).

CONCLUSION

A system and method has been shown in the above embodiments for the effective implementation of a method for estimating the number of distinct values in a partitioned dataset. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by size, materials, or specific manufacturing techniques.

The invention claimed is:

1. A computer-based method to estimate distinct values in a partitioned dataset, said computer-based implemented in computer readable program code stored in computer memory, said computer-based method comprising the steps of:
 a. creating a synopsis of each partition in a partitioned dataset;
 b. combining created synopsis to construct distinct value (DV) estimations of a base partition or of a compound partition that is based on at least one of the following multiset operations: multiset-union, multiset-intersection, and multiset-difference; and
 c. outputting said constructed DV estimations in (b); and
 wherein said step of creating synopsis of a partition further comprises the steps of: selecting a hash function h with domain $\mathcal{D}$, which is a value domain of the partitioned dataset, and range $\{0, 1, \ldots, M\}$, wherein $M=O(|\mathcal{D}|^2)$ and $|\mathcal{D}|$ is the number of distinct values in $\mathcal{D}$, said hash function h to be used for all synopses in said partitioned dataset;
 when a partition is a base partition A with domain $\mathcal{D}(A)$:
  i. hashing each value in $\mathcal{D}(A)$ using hash function h;
  ii. recording k smallest values $h(v_1), h(v_2), \ldots, h(v_k)$ among said hashed values, as well as recording the multiplicity of each of the values $v_1, v_2, \ldots, v_k$ in A, and
  iii. creating said synopsis as an AKMV synopsis $L_A^+ = (L_A, c_A)$ based on said recorded k smallest values and said recorded multiplicities; or when a partition is a compound partition G=E op F, where op is one of $\cup_m, \cap_m$, and $\setminus_m$, and E and F have respective AKMV synopses $L_E^+ = (L_E, c_E)$ and $L_F^+ = (L_F, c_F)$ of sizes $k_E$ and $k_F$, creating said synopsis as an AKMV synopsis $L_G^+ = (L_E \oplus L_F, c_G)$, where, for each $w \in L_E \oplus L_F$, $c_G$ $$c_G(w) = \begin{cases} c_E(w) + c_F(w) & \text{if } op = \cup_m \\ \min(c_E(w), c_F(w)) & \text{if } op = \cap_m \\ \max(c_E(w) - c_F(w), 0) & \text{if } op = \setminus_m. \end{cases}$$

2. The computer-based method of claim 1, wherein the following unbiased estimator is used to construct said DV estimations for a partition E having an AKMV synopsis $L_E^+ = (L_E, c_E)$ of size k:

$$\hat{D}_E = \frac{K_E}{k}\left(\frac{k-1}{U_{(k)}}\right)$$

wherein $K_E$ is the number of non-zero elements in $c_E$ and $U_{(k)}$ is the largest value in $L_E$, multiplied by a factor of $1/M$.

3. The computer-based method of claim 2, wherein estimator error of said DV estimator $\hat{D}_E$ is assessed as any of, or a combination of, the following:
 (i) a number $\epsilon_p$ that bounds the expected absolute ratio error (ARE) from above with probability approximately 100p %, wherein said number $\epsilon_p$ is computed as the solution to the equation $p = \Delta(k\hat{D}_E/j, k, \epsilon_p)$, with k the size of the AKMV synopsis $L_E^+ = (L_E, c_E)$ for E and j the observed number of nonzero elements in $c_E$, or
 (ii) an approximate variance of estimator $\hat{D}_E$, computed as $$\text{Var}[\hat{D}_E] \approx \frac{\hat{D}_E\left(\frac{(k-1)^2}{U_{(k)}} - k^2 + k + \hat{D}_E\right)}{k(k-2)}.$$

4. The computer-based method of claim 1, wherein said AKMV synopses are maintained in the presence of deletions by:
 (i) updating the synopsis (L, c) of a partition after deletion of a value v from the partition, wherein h(v) =w, by updating counter c(w) according to c(w)=max(c(w) −1, 0), if w is present in L, and
 (ii) by periodically recomputing the synopsis from scratch when estimation errors become unacceptable.

5. The computer-based method of claim 1, wherein the size k of each of the synopses for the base partitions is chosen a priori by setting $k = \lceil 2 + 2/(\pi\epsilon^2) \rceil$, where $\epsilon$ is a desired upper bound on the expected ARE of a base-partition DV estimate.

6. An article of manufacture comprising computer usable medium implementing a computer-based to estimate distinct values in a partitioned dataset, said computer usable medium comprising:
 a. computer readable program code creating a synopsis of each partition in a partitioned dataset;
 b. computer readable program code combining created synopsis to construct distinct value (DV) estimations of a base partition or of a compound partition that is based on at least one of the following multiset operations: multiset-union, multiset-intersection, and multiset-difference; and
 c. computer readable program code aiding in outputting said constructed DV estimations in (b)
 wherein said step of creating synopsis of a partition further comprises the steps of: selecting a hash function h with domain $\mathcal{D}$, which is a value domain of the partitioned dataset, and range $\{0, 1, \ldots, M\}$, wherein $M=O(|\mathcal{D}|^2)$ and |𝔇| is the number of distinct values in 𝔇, said hash function h to be used for all synopses in said partitioned dataset;

when a partition is a base partition A with domain 𝔇(A):
  i. hashing each value in 𝔇(A) using hash function h;
  ii. recording k smallest values $h(v_1), h(v_2), \ldots, h(v_k)$ among said hashed values, as well as recording the multiplicity of each of the values $v_1, v_2, \ldots, v_k$ in A, and
  iii. creating said synopsis as an AKMV synopsis $L_A^+ = (L_A, c_A)$ based on said recorded k smallest values and said recorded multiplicities; or when a partition is a compound partition G=E op F, where op is one of $\cup_m, \cap_m,$ and $\setminus_m$, and E and F have respective AKMV synopses $L_E^+ = (L_E, c_E)$ and $L_F^+ = (L_F, c_F)$ of sizes $k_E$ and $k_F$, creating said synopsis as an AKMV synopsis $L_G^+ = (L_E \oplus L_F, c_G)$, where, for each $w \in L_E \oplus L_F$, $$c_G(w) = \begin{cases} c_E(w) + c_F(w) & \text{if } op = \bigcup_m \\ \min(c_E(w), c_F(w)) & \text{if } op = \bigcap_m \\ \max(c_E(w) - c_F(w), 0) & \text{if } op = \setminus_m. \end{cases}$$

7. The article of manufacture of claim 6, wherein computer readable program code uses the following unbiased estimator to construct said DV estimations for a partition E having an AKMV synopsis $L_E^+ = (L_E, c_E)$ of size k:

$$\hat{D}_E = \frac{K_E}{k}\left(\frac{k-1}{U_{(k)}}\right)$$

wherein $K_E$ is the number of non-zero elements in $c_E$ and $U_{(k)}$ is the largest value in $L_E$, multiplied by a factor of 1/M.

8. The article of manufacture of claim 7, wherein computer readable program code assesses estimator error of said DV estimator $\hat{D}_E$ as any of, or a combination of, the following:
  (i) a number $\epsilon_p$ that bounds the expected absolute ratio error (ARE) from above with probability approximately 100 p %, wherein said number $\epsilon_p$ is computed as the solution to the equation $p = \Delta(k\hat{D}_E/j, k, \epsilon_p)$, with k the size of the AKMV synopsis $L_E^+ = (L_E, c_E)$ for E and j the observed number of nonzero elements in $c_E$, or
  (ii) an approximate variance of estimator $\hat{D}_E$, computed as $$\text{Var}[\hat{D}_E] \approx \frac{\hat{D}_E\left(\frac{(k-1)^2}{U_{(k)}} - k^2 + k + \hat{D}_E\right)}{k(k-2)}.$$

9. The article of manufacture of claim 6, wherein computer readable program code aids in maintaining said AKMV synopses in the presence of deletions by:
  (iii) updating the synopsis (L, c) of a partition after deletion of a value v from the partition, wherein h(v)=w, by updating counter c(w) according to c(w)=max(c(w) −1, 0), if w is present in L, and
  (iv) by periodically recomputing the synopsis from scratch when estimation errors become unacceptable.

10. The article of manufacture of claim 6, wherein computer readable program code choosing, a priori, the size k of each of the synopses for the base partitions by setting $k = \lceil 2 + 2/(\pi\epsilon^2) \rceil$, where $\epsilon$ is a desired upper bound on the expected ARE of a base-partition DV estimate.

11. A computer-based method to estimate distinct values in a partitioned dataset, said computer-based implemented in computer readable program code stored in computer memory, said computer-based method comprising the steps of:
  a. selecting a hash function h with domain 𝔇, which is a value domain of the partitioned dataset, and range $\{0, 1, \ldots, M\}$, wherein $M = O(|𝔇|^2)$ and |𝔇| is the number of distinct values in 𝔇, said hash function h to be used for all synopses in said partitioned dataset;
  b. when a partition being a base partition A with domain 𝔇(A) hashing each value in 𝔇(A) using hash function h; recording k smallest values $h(v_1), h(v_2), \ldots, h(v_k)$ among said hashed values, as well as recording the multiplicity of each of the values $v_1, v_2, \ldots, v_k$ in A, and creating said synopsis as an AKMV synopsis $L_A^+ = (L_A, c_A)$ based on said recorded k smallest values and said recorded multiplicities;
  c. when a partition being a compound partition G=E op F, where op is one of $\cup_m, \cap_m,$ and $\setminus_m$, and E and F have respective AKMV synopses $L_E^+ = (L_E, c_E)$ and $L_F^+ = (L_F, c_F)$ of sizes $k_E$ and $k_F$, creating said synopsis as an AKMV synopsis $L_G^+ = (L_E \oplus L_F, c_G)$, where, for each $w \in L_E \oplus L_F$, $$c_G(w) = \begin{cases} c_E(w) + c_F(w) & \text{if } op = \bigcup_m \\ \min(c_E(w), c_F(w)) & \text{if } op = \bigcap_m \\ \max(c_E(w) - c_F(w), 0) & \text{if } op = \setminus_m. \end{cases}$$

d. combining synopsis created in (b) and (c) to construct distinct value (DV) estimations of a base partition or of a compound partition that is based on at least one of the following multiset operations: multiset-union, multiset-intersection, and multiset-difference; and
  e. outputting said constructed DV estimations in (d),
  wherein the following unbiased estimator is used to construct said DV estimations for a partition E having an AKMV synopsis $L_E^+ = (L_E, c_E)$ of size k:

$$\hat{D}_E = \frac{K_E}{k}\left(\frac{k-1}{U_{(k)}}\right)$$

wherein $K_E$ is the number of non-zero elements in $c_E$ and $U_{(K)}$ is the largest value in $L_E$, multiplied by a factor of 1/M.

12. The computer-based method of claim 11, wherein estimator error of said DV estimator $\hat{D}_E$ is assessed as any of, or a combination of, the following:
  (i) a number $\epsilon_p$ that bounds the expected absolute ratio error (ARE) from above with probability approximately 100 p %, wherein said number $\epsilon_p$ is computed as the solution to the equation $p = \Delta(k\hat{D}_E/j, k, \epsilon_p)$, with k the size of the AKMV synopsis $L_E^+ = (L_E, c_E)$ for E and j the observed number of nonzero elements in $c_E$, or
  (ii) an approximate variance of estimator $\hat{D}_E$, computed as $$\text{Var}[\hat{D}_E] \approx \frac{\hat{D}_E\left(\frac{(k-1)^2}{U_{(k)}} - k^2 + k + \hat{D}_E\right)}{k(k-2)}.$$

13. The computer-based method of claim 11, wherein said AKMV synopses are maintained in the presence of deletions by:

(i) updating the synopsis (L, c) of a partition after deletion of a value v from the partition, wherein h(v)=w, by updating counter c(w) according to c(w)=max(c(w) −1, 0), if w is present in L, and (ii) by periodically recomputing the synopsis from scratch when estimation errors become unacceptable.

14. The computer-based method of claim 11, wherein the size k of each of the synopses for the base partitions is chosen a priori by setting $k=\lceil 2+2/(\pi\epsilon^2)\rceil$, where $\epsilon$ is a desired upper bound on the expected ARE of a base-partition DV estimate.

* * * * *